United States Patent
Hayashi

(10) Patent No.: US 9,563,245 B2
(45) Date of Patent: Feb. 7, 2017

(54) ELECTRONIC DEVICE AND COMPUTER READABLE MEDIUM

(71) Applicant: NIKON CORPORATION, Tokyo (JP)

(72) Inventor: Masaki Hayashi, Chiba (JP)

(73) Assignee: Nikon Corporation, Tokyo (JP)

( * ) Notice: Subject to any disclaimer, the term of this patent is extended or adjusted under 35 U.S.C. 154(b) by 110 days.

(21) Appl. No.: 14/243,988

(22) Filed: Apr. 3, 2014

(65) Prior Publication Data

US 2014/0215234 A1    Jul. 31, 2014

Related U.S. Application Data

(63) Continuation of application No. PCT/JP2012/006308, filed on Oct. 2, 2012.

(30) Foreign Application Priority Data

Oct. 13, 2011    (JP) .................................. 2011-226103

(51) Int. Cl.
| | |
|---|---|
| *G06F 1/00* | (2006.01) |
| *G06F 1/26* | (2006.01) |
| *G06F 1/32* | (2006.01) |
| *H04N 5/232* | (2006.01) |

(52) U.S. Cl.
CPC ................. *G06F 1/266* (2013.01); *G06F 1/32* (2013.01); *H04N 5/23241* (2013.01)

(58) Field of Classification Search
CPC ......... G06F 1/266; G06F 1/32; H04N 5/23241
See application file for complete search history.

(56) References Cited

U.S. PATENT DOCUMENTS

| | | | | |
|---|---|---|---|---|
| 8,052,438 | B1 * | 11/2011 | Hung ..................... | H01R 24/60 439/131 |
| 2001/0019226 | A1 * | 9/2001 | Ekelund ................... | H02J 1/10 307/29 |
| 2003/0189644 | A1 | 10/2003 | Kikugawa | |
| 2003/0226898 | A1 | 12/2003 | Chen et al. | |

(Continued)

FOREIGN PATENT DOCUMENTS

| | | |
|---|---|---|
| CN | 101634886 A | 1/2010 |
| JP | 2001-346092 A | 12/2001 |

(Continued)

OTHER PUBLICATIONS

Apr. 15, 2014 International Preliminary Report on Patentability issued in International Application No. PCT/JP2012/006308.

(Continued)

*Primary Examiner* — Mohammed Rehman
*Assistant Examiner* — Austin Hicks
(74) *Attorney, Agent, or Firm* — Oliff PLC

(57) ABSTRACT

An electronic device comprising a connecting section; a first IF circuit that communicates through the connecting section with an external device connected via the connecting section, at a first communication speed; a second IF circuit that communicates through the connecting section with the external device, at a communication speed that is higher than the first communication speed; and a control section that, when one of the first IF circuit and the second IF circuit is selected as an IF circuit to be used for communication, limits a power supply to the other IF circuit.

23 Claims, 12 Drawing Sheets

(56) References Cited

U.S. PATENT DOCUMENTS

| | | |
|---|---|---|
| 2006/0161716 A1 | 7/2006 | Lin |
| 2009/0061918 A1* | 3/2009 | Emara ............... H04W 52/0274 455/522 |
| 2009/0248924 A1 | 10/2009 | Melin |
| 2010/0241883 A1* | 9/2010 | Liao ........................ G06F 1/325 713/321 |
| 2010/0274962 A1* | 10/2010 | Mosek ................ G06F 12/0804 711/113 |
| 2011/0314196 A1* | 12/2011 | Ortiz ..................... G06F 13/385 710/106 |
| 2012/0095312 A1* | 4/2012 | Ramey .................. A61B 5/002 600/365 |
| 2012/0290761 A1* | 11/2012 | Chen ....................... G06F 13/42 710/305 |

FOREIGN PATENT DOCUMENTS

| | | |
|---|---|---|
| JP | 2003-280778 A | 10/2003 |
| JP | 2004-118343 A | 4/2004 |
| JP | 2005-065136 A | 3/2005 |
| JP | 2005-065137 A | 3/2005 |
| JP | 2005-078475 A | 3/2005 |
| JP | A-2005-117232 | 4/2005 |
| JP | A-2006-159753 | 6/2006 |
| JP | A-2006-217327 | 8/2006 |
| JP | 2007-306180 A | 11/2007 |
| JP | 2007-329577 A | 12/2007 |
| JP | A-2008-158840 | 7/2008 |
| JP | 2009-094663 A | 4/2009 |
| JP | A-2009-294797 | 12/2009 |
| JP | A-2010-055265 | 3/2010 |
| JP | A-2010-231795 | 10/2010 |

OTHER PUBLICATIONS

Nov. 13, 2012 International Search Report issued in International Application No. PCT/JP2012/006308 (with translation).
Nov. 24, 2015 Office Action issued in Japanese Application No. 2011-226103.
Dec. 23, 2015 Search Report issued in European Application No. 12840444.9.
Jan. 20, 2016 Office Action issued in Chinese Application No. 201280049713.6.
Feb. 23, 2016 Office Action issued in Japanese Application No. 2011-226103.
Jul. 20, 2016 Office Action issued in Japanese Application No. 2011-226103.

* cited by examiner

| RESOLUTION | COMPRESSION | FRAME RATE | SELECTED IF |
|---|---|---|---|
| HIGH RESOLUTION | LOW COMPRESSION | HIGH SPEED | USB3 IF |
| HIGH RESOLUTION | LOW COMPRESSION | LOW SPEED | USB3 IF |
| HIGH RESOLUTION | HIGH COMPRESSION | HIGH SPEED | USB3 IF |
| HIGH RESOLUTION | HIGH COMPRESSION | LOW SPEED | USB2 IF |
| LOW RESOLUTION | LOW COMPRESSION | HIGH SPEED | USB3 IF |
| LOW RESOLUTION | LOW COMPRESSION | LOW SPEED | USB2 IF |
| LOW RESOLUTION | HIGH COMPRESSION | HIGH SPEED | USB2 IF |
| LOW RESOLUTION | HIGH COMPRESSION | LOW SPEED | USB2 IF |

FIG. 6

| REMAINING CAPACITY | SELECTED IF |
|---|---|
| LARGE | USB3 IF |
| SMALL | USB2 IF |

FIG. 7

| TEMPERATURE | SELECTED IF |
|---|---|
| LOW TEMPERATURE | USB3 IF |
| HIGH TEMPERATURE | USB2 IF |

FIG. 8

ELECTRONIC DEVICE AND COMPUTER READABLE MEDIUM

The contents of the following Japanese and PCT patent applications are incorporated herein by reference:
NO. 2011-226103 filed on Oct. 13, 2011, and
NO. PCT/JP2012/006308 filed on Oct. 2, 2012.

BACKGROUND

1. Technical Field

The present invention relates to an electronic device and a computer readable medium.

2. Related Art

A peripheral device is known that includes an MCU block and a USB control block that operate based on a power supply voltage of a USB power supply bus, when the peripheral device is connected to a personal computer (PC) via a USB, such as shown in Patent Document 1, for example. When the peripheral device is disconnected from the PC, the power supply from the USB power supply bus to the USB block stops, and power supply voltage is supplied from a battery driving the peripheral device to the MCU block. Patent Document 1: Japanese Patent Application Publication No. 2010-231795

When a communication IF section corresponding to High-Speed USB 2.0 and a communication interface corresponding to SuperSpeed USB 3.0 are provided as communication IF sections compliant with the USB 3.0 standard, the power consumed by each IF section is increased. In this way, when a communication IF section corresponding to high-speed communication and a communication IF section corresponding to low-speed communication are both provided, the power consumption is increased.

SUMMARY

According to a first aspect of the present invention, provided is an electronic device comprising a connecting section; a first IF circuit that communicates through the connecting section with an external device connected via the connecting section, at a first communication speed; a second IF circuit that communicates through the connecting section with the external device, at a communication speed that is higher than the first communication speed; and a control section that, when one of the first IF circuit and the second IF circuit is selected as an IF circuit to be used for communication, limits a power supply to the other IF circuit.

According to a second aspect of the present invention, provided is a computer readable medium storing thereon a program that causes a computer, which includes a first IF circuit that communicates through a connecting section with an external device connected via the connecting section at a first communication speed and a second IF circuit that communicates through the connecting section with the external device at a communication speed that is higher than the first communication speed, to: perform control by, when one of the first IF circuit and the second IF circuit is selected as an IF circuit to be used for communication, limiting a power supply to the other IF circuit.

The summary clause does not necessarily describe all necessary features of the embodiments of the present invention. The present invention may also be a sub-combination of the features described above.

BRIEF DESCRIPTION OF THE DRAWINGS

FIG. 6 shows a table format of an example for selection of the IF to be used for communication.

FIG. 7 shows another example of selection of the IF to be used for communication, in a table format.

FIG. 8 shows yet another example of selection of the IF to be used for communication, in a table format.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
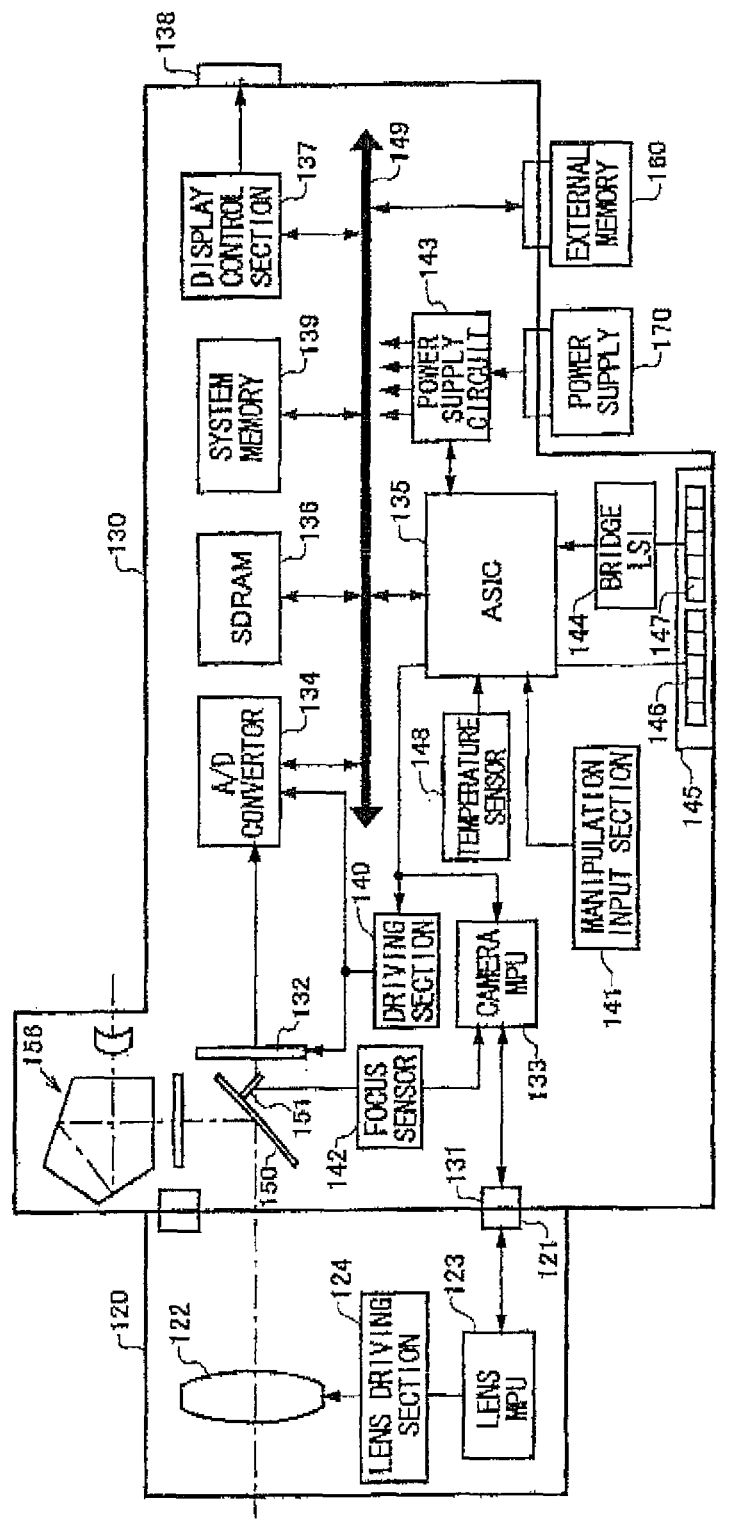
FIG. 1 shows an exemplary system configuration of an image capturing apparatus 100.

FIG. 1 shows an exemplary system configuration of an image capturing apparatus 100. The image capturing apparatus 100 includes a communication interface (communication IF) corresponding to high-speed communication and can restrict the increase in power consumption. First, the basics of the system configuration of the image capturing apparatus 100 will be described.

The image capturing apparatus 100 is exemplified by an interchangeable lens camera, and includes an interchangeable lens 120 and a camera body 130. The interchangeable lens 120 includes a lens mount that has a lens mount contact point 121, and the camera body 130 includes a camera mount that has a camera mount contact point 131. When the lens mount and camera mount are engaged such that the interchangeable lens 120 and the camera body 130 are formed integrally, the lens mount contact point 121 and the camera mount contact point 131 are connected. The image capturing apparatus 100 functions as a single lens reflex camera when the interchangeable lens 120 and the camera body 130 are formed integrally. A lens MPU 123 is connected to a camera MPU 133 via the lens mount contact point 121 and the camera mount contact point 131, and the lens MPU 123 and camera MPU 133 communicate and cooperate with each other to control the interchangeable lens 120.

The interchangeable lens 120 includes a lens group 122, a lens driving section 124, and the lens MPU 123. Subject light passes along the optical axis through the lens group 122, serving as an optical system of the interchangeable lens 120, and is incident to the camera body 130. The main mirror 150 can be in an inclined state in which the main mirror 150 is inclined relative to the subject light beam, with the optical axis of the lens group 122 serving as the center, and a withdrawn state in which the main mirror 150 is withdrawn.

When the main mirror 150 is in the inclined state, the main mirror 150 reflects a position of the subject light beam passed through the lens group 122. The subject light beam reflected by the main mirror 150 is guided to the optical finder section 156, and observed by a user. The user can check the image composition or the like through the optical finder section 156.

The region near the optical axis of the main mirror 150 in the inclined state is formed as a half mirror, and passes a portion of the subject light beam incident thereto. The subject light beam passed through the region near the optical axis of the main mirror 150 is reflected by the sub-mirror 151, and guided to the focus sensor 142. The focus sensor 142 includes a plurality of photoelectric conversion element rows that receive the subject light beam. The photoelectric conversion element rows output signals with matching phases when in a focused state, and output signals with shifted phases when in a state that is defocused to the front or back. The amount of the phase shift corresponds to the amount of shift from the focused state. The focus sensor 142 detects the phase difference by performing a correlation calculation for the outputs of the photoelectric conversion element rows, and outputs a phase difference signal indicating this phase difference to the camera MPU 133.

The focused state of the lens group 122 is adjusted using the phase difference signal from the focus sensor 142, under the control of the camera MPU 133 and the like. For example, the camera MPU 133 determines a target position of a focus lens included in the lens group 122, based on the focused state detected according to the phase difference signal, and the lens MPU 123 controls the position of the focus lens to move toward the determined target position. Specifically, the lens MPU 123 controls the lens driving section 124 that includes a focus lens motor, for example, and moves the focus lenses forming the lens group 122. In this way, when the main mirror 150 is down in the inclined state, the focused state of the lens group 122 is detected and the focal point is adjusted using phase difference detection. A focus sensor 142 is provided corresponding to each specified region of a subject image, and each focus sensor 142 can adjust the focused state in the corresponding specified region.

When the main mirror 150 is withdrawn from the path of the subject light beam, the sub-mirror 151 moves together with the main mirror 150 to be withdrawn from the path of the subject light beam. When the main mirror 150 is in the withdrawn state, the subject light beam passed through he lens group is incident to a light receiving surface of the image capturing element 132.

The image capturing element 132 functions as an image capturing section, and captures an image of a subject based on the subject light beam passed by the lens group 122. A fixed image capturing element such as a CCD sensor or CMOS sensor can be used as the image capturing element 132, for example. The image capturing element 132 includes a plurality of photoelectric conversion elements that receive the subject light beam, and outputs to the A/D converter 134 an analog signal corresponding to an accumulated charge amount generated by each of the photoelectric conversion elements. The A/D converter 134 converts the analog signal output from the image capturing element 332 into a digital signal representing the image data, and outputs this digital signal. The image capturing element 132 and the A/D converter 134 are driven by a driving section 140 that receives instructions from an ASIC 135 functioning as an engine that controls the primary functions of the image capturing apparatus 100.

The image data output by the A/D converter 134 is stored in a SDRAM 136, which is an example of a non-volatile memory. At least a portion of the memory region in the SDRAM 136 is used as a buffer region that temporarily stores image data. When the image capturing element 132 captures images in series, the sequentially generated pieces of image data are stored sequentially in the buffer region. The pieces of image data captured in series by the image capturing element 132 are stored sequentially in the buffer region, as image data forming a series of still images or as image data for each image forming a moving image. The image data of an image forming a moving image can be referred to as a "frame." The SDRAM 136 functions as a frame memory that temporarily stores the frames when the ASIC 135 processes a moving image.

The ASIC 135 processes the image data stored in the SDRAM 136. The ASIC 135 is an integrated circuit including a circuit relating to an image processing function, a circuit relating to a communication function, and the like. The ASIC 135 performs image processing using at least a portion of the SDRAM 136 as a work area for image processing. The ASIC 135 performs image processing such as defective pixel correction, white balance correction, color interpolation, color correction, and outline enhancement, for example.

The ASIC 135 converts the image data into image data having a standardized image format, and outputs the converted image data. For example, the ASIC 135 performs image processing to convert image data of a still image into still image data that is encoded with an encoding format in compliance with a certain standard, such as JPEG. Furthermore, the ASIC 135 performs image processing to convert a plurality of frames into moving image data that is encoded with an encoding format in compliance with a certain standard, such as H.264, MPEG2, or Motion Jpeg.

The ASIC 135 transmits the image data including the generated still image data, moving image data, and the like to the external memory 160, which is an example of a non-volatile recording medium, and records this image data in the external memory 160. The external memory 160 can be a semiconductor memory such as a flash memory, for example. The ASIC 135 outputs the generated image data to a USB device, which is an example of an external device, via the connecting section 145. For example, the image capturing apparatus 100 functions as a USB device. The ASIC 135 outputs the image data to a USB host, which is an example of a USB device, via the connecting section 145.

The connecting section 145 is a USB receptacle compliant with USB 3.0, for example. In the present example, the connecting section 145 is a USB 3.0 Micro-B receptacle. The connecting section 145 includes a connection terminal 146 for USB 2.0 High-Speed (HS) communication and a connection terminal 147 for USB 3.0 SuperSpeed (SS) communication. The connection terminal 146 includes a VBUS terminal, a D+ terminal and D− terminal connected to a signal line, a GND terminal, and an ID terminal with a USB On-The-Go standard. The connection terminal 147 includes a D+ terminal and a D− terminal connected to a signal transmission line, a D+ terminal and a D− terminal connected to a signal reception line, and a GND terminal.

A communication IF circuit adapted for USB 2.0 HS is included in the ASIC 135, and communicates with a USB host connected thereto by the connecting section 145, with a communication speed determined by USB 2.0 HS. The communication speed determined by USB 2.0 HS is an example of a first communication speed. The communication IF circuit included in the ASIC 135 communicates with the USB host via the connection terminal 146. The bridge LSI 144 communicates with the USB host via the connecting section 145, with a speed that is higher than the first communication speed. For example, the bridge LSI 144 is provided independently outside the ASIC 135, and is a circuit including a communication IF circuit adapted for USB 3.0 SS. The bridge LSI 144 is connected to a bus or the like that can communicate with the ASIC 135. The bridge LSI 144 communicates with the USB host connected thereto via the connecting section 145, with a speed that is higher than the first communication speed through the connection terminal 147. The ASIC 135 is connected to the bridge LSI 144, and communicates with the USB host via the bridge LSI 144. In the description of the present embodiment, the communication IF circuit is sometimes shortened to simply "the IF."

The ASIC 135 detects a contrast amount from the image data, and supplies the camera MPU 133 with this contrast amount. For example, the ASIC 135 detects the contrast amount for each of a plurality of pieces of image data acquired by image capturing while moving the focus lens to different positions in the optical axis direction. The camera MPU 133 adjusts the focused state of the lens group 122 based on the detected contrast amount and the position of the focus lens. For example, the camera MPU 133 determines a target position of the focus lens that would increase the contrast amount, and the lens MPU 123 controls the position of the focus lens in a manner to move the focus lens toward the determined target position. In this way, when the main mirror 150 is up in the withdrawn state, the focused state of the lens group 122 is detected and the focal point is adjusted using contrast detection. In this way, the camera MPU 133 works together with the ASIC 135 and the lens MPU 123 to adjust the focal point of the lens group 122.

The ASIC 135 generates the image data for display in parallel with the generation of the image data for recording. During playback, the ASIC 135 generates the image data for display from the image data read from the external memory 160. The generated image data for display is converted into an analog signal under the control of the display control section 137, and is displayed in a display section 138 serving as a display device, such as a liquid crystal display. Furthermore, a variety of menu items relating to each type of setting of the image capturing apparatus 100 can be displayed in the display section 138 under the control of the display control section 137, either together with an image or without an accompanying image. The ASIC 135 controls the display control section 137 to display the menu items in the display section 138.

The image capturing apparatus 100 is directly or indirectly controlled by the camera MPU 133 and the ASIC 135, including the control described above. The system memory 139 is a non-volatile memory capable of electrically storing and deleting data, and is formed by a flash ROM, EEPROM, or the like. The system memory 139 stores programs and control parameters, such as constants and variables needed for the image capturing apparatus 100 to operate, in a manner to not be lost when the image capturing apparatus 100 is non-operational. The constants, variables, programs, and the like stored in the system memory 139 are expanded from the system memory 139 to the SDRAM 136, and used to control the image capturing apparatus 100. In the camera body 130, the ASIC 135, the SDRAM 136, the system memory 139, the display control section 137, the camera MPU 133, and the external memory 160 are connected to each other by a connection interface 149, such as a bus.

The manipulation input section 141 receives user manipulation. The manipulation input section 141 includes keys, such as a power supply switch, a release button, and a variety of manipulation buttons, and a member such as touch panel implemented integrally in the display section 138. The ASIC 135 detects that the manipulation input section 141 has been manipulated, and performs an operation corresponding to the manipulation. For example, when the release button is manipulated, the ASIC 135 controls the components of the image capturing apparatus 100 to perform a release operation. As another example, when an image capturing operation mode is set to a rapid shooting mode, the ASIC 135 controls the components of the image capturing apparatus 100 to capture a series of still images while the release button is pressed. When a moving image button is manipulated, the ASIC 135 controls the components of the image capturing apparatus 100 to read to the image capturing element 132 using rolling reading, for example. When a touch panel implemented in the display section 138 is manipulated, the ASIC 135 controls the components of the image capturing apparatus 100 to perform an operation corresponding to the manipulation content and menu items displayed in the display section 138.

The temperature sensor 148 detects the temperature within the image capturing apparatus 100. The ASIC 135 controls the components of the image capturing apparatus 100 according to the temperature detected by the temperature sensor 148. For example, the ASIC 135 communicates with the USB host using USB 3.0 SS through the bridge LSI 144, on a condition that the temperature detected by the temperature sensor 148 is less than a predetermined value. In contrast, the ASIC 135 limits the power supply to the bridge LSI 144 and communicates with the USB host using USB 2.0 HS, on a condition that the temperature detected by the temperature sensor 148 is greater than or equal to a predetermined value.

The elements of the camera body 130 and the external memory 160 receive power from the power supply 170 via the power supply circuit 143. The power supply 170 can be a power supply line or a two-dimensional battery such as a lithium ion battery that can be attached to and detached from the camera body 130, for example. The two-dimensional battery is an example of a battery, and the term "battery" also includes non-rechargeable batteries that substantially cannot be charged. The ASIC 135 controls the power supply to each component of the image capturing apparatus 100 from the power supply 170, by controlling the power supply circuit 143.

The ASIC 135 detects the state of the power supply via the power supply circuit 143, and controls the components of the image capturing apparatus 100 according to the state of the power supply. For example, the power supply circuit 143 provides the ASIC 135 with the state of the power supply including remaining capacity of a two-dimensional battery, voltage level of a two-dimensional battery, or the type of the battery, e.g. whether the power supply 170 is a two-dimensional battery. The ASIC 135 determines whether the power supply 170 is a two-dimensional battery. If it is determined that the power supply 170 is a two-dimensional battery, the ASIC 135 detects the remaining capacity of the two-dimensional battery, and controls the component of the image capturing apparatus 100 according to the remaining capacity. For example, the ASIC 135 communicates with the USB host using USB 3.0 SS through the bridge LSI 144, on a condition that the remaining capacity is greater than or equal to a predetermined value. In contrast, the ASIC 135 limits the power supply to the bridge LSI 144 and communicates with the USB host using USB 2.0 HS, on a condition that the remaining capacity is less than the predetermined value. If it is determined that the power supply 170 is a two-dimensional battery, the ASIC 135 may control the components of the image capturing apparatus 100 according to the capacity of the two-dimensional battery. For example, the ASIC 135 communicates with the USB host using USB 3.0 SS through the bridge LSI 144, on a condition that the capacity of the two-dimensional battery is greater than or equal to a predetermined value. In contrast, the ASIC 135 limits the power supply to the bridge LSI 144 and communicates with the USB host using USB 2.0 HS, on a condition that the capacity is less than the predetermined value. Here, the capacity of the two-dimensional battery can be the discharge capacity, rated capacity, or the like indicating the amount of electricity that can be drawn from the two-dimensional battery when fully charged, for example. Information indicating the capacity of the two-dimensional battery is stored in the memory of the two-dimensional battery, and the power supply circuit 143 may acquire this information indicating the capacity of the two-dimensional battery from the memory and provide the information to the ASIC 135. It is clearly obvious that different values can be used as the predetermined value the remaining capacity of a battery and the predetermined value for the capacity of a battery.

Figure 2:
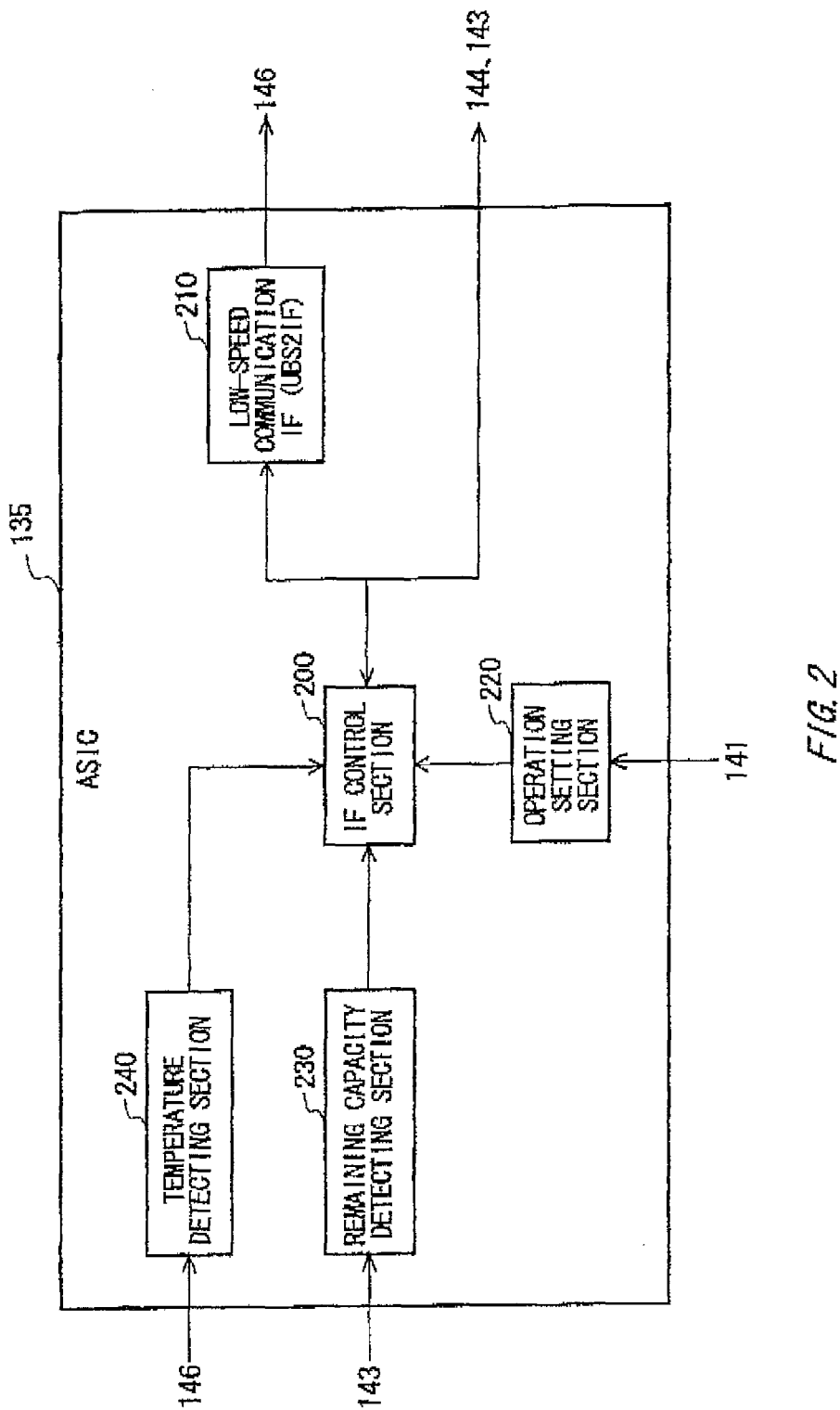
FIG. 2 shows an exemplary function block configuration of the ASIC 135.

FIG. 2 shows an exemplary function block configuration of the ASIC 135. Here, among the function blocks of the ASIC 135, function blocks are shown that are used for communication with the USB host via the connecting section 145. The ASIC 135 includes an IF control section 200, a USB2 IF 210 that is an example of a low-speed communication IF section, an operation setting section 220, a remaining capacity detecting section 230, and a temperature detecting section 240.

The USB2 IF 210 is a circuit portion adapted for USB 2.0, and communicates with the USB host connected thereto by the connecting section 145, through the connecting section 145. Specifically, the USB2 IF 210 is connected to the connection terminal 146 and communicates with the USB host connected thereto via the connection terminal 146, through the connection terminal 146.

The VBUS terminal of the connection terminal 146 is an example of one detection terminal for detecting that the image capturing apparatus 100 is electrically connected to the USB host via the connecting section 145. The IF control section 200 detects that the USB host is connected via the connecting section 145, using the VBUS terminal. In this way, the ASIC 135 can detect that the USB host is connected via the connecting section 145, using the VBUS terminal.

When the IF circuit of one of the USB2 IF 210 and the bridge LSI 144 is selected as the IF circuit to be used for communication, the IF control section 200 limits the supply of power to the other IF circuit. For example, the IF control section 200 causes the other IF circuit to transition to a power saving state. When limiting the power supply to the bridge LSI 144, the IF control section 200 may cut off the power supply to the bridge LSI 144. Furthermore, the IF control section 200 displays in the display section 138 information indicating the IF circuit selected as the IF circuit to be used for communication with the USB host. For example, USB 2.0 and USB 3.0 are displayed separately in the display section 138.

The operation setting section 220 sets the operational mode of the image capturing apparatus 100 according to the user manipulation of the manipulation input section 141 or the like. For example, the operation setting section 220 sets the operational mode for the frame rate, and the compression rate and resolution of the image data to be output. The operation setting section 220 sets an operational mode including image capturing operations, such as a rapid image capturing mode and a low speed image capturing mode. The operation setting section 220 selects the IF circuit to be used for communication based on an operational mode of the bridge LSI 144 and the USB2 IF 210.

The remaining capacity detecting section 230 detects the remaining capacity of the battery that supplies operating power to the image capturing apparatus 100. Specifically, the remaining capacity detecting section 230 calculates the remaining capacity of the battery as the power supply 170, based on the output provided from the power supply circuit 143. For example, the remaining capacity detecting section 230 calculates the remaining amount of the battery based on the voltage level of the battery. The control section 200 selects one of the USB2 IF 210 and the bridge LSI 144 to be the IF used for communication with the USB host, based on the remaining capacity, and has the selected IF communicate with the USB host. For example, the IF control section 200 communicates with the USB host using the bridge LSI 144, and when the detected remaining capacity is less than the predetermined value, may notify the USB host that communication will be performed using the USB2 IF 210.

The IF control section 200 selects one of the USB2 IF 210 and the bridge LSI 144 for communication with the USB host, based on the capacity of the battery, and causes the selected IF to communicate with the USB host. Specifically, the IF control section 200 acquires the information indicating the capacity of the battery provided from the power supply circuit 143. If the capacity of the battery is less than a predetermined value, the IF control section 200 selects the USB2 IF 210 as the IF circuit to be used for communication with the USB host. For example, if the capacity of the battery is less than the predetermined value, the IF control section 200 prohibits the bridge LSI 144 from being selected as the IF circuit to be used for communication with the USB host. If the capacity of the battery is greater than or equal to the predetermined value, the IF control section 200 may allow the bridge LSI 144 to be selected as the IF circuit to be used for communication with the USB host. For example, even when the capacity of the battery is greater than or equal to the predetermined value, if the remaining capacity of the battery is less than a predetermined value, the IF control section 200 may select the USB2 IF 210 as the IF circuit to be used for communication with the USB host.

The temperature detecting section 240 calculates the temperature within the image capturing apparatus 100. Specifically, the temperature detecting section 240 calculates the temperature based on the output of the temperature sensor 148. The IF control section 200 selects one of the USB2 IF 210 and the bridge LSI 144 as the IF to be used for communication with the USB host based on the temperature calculated by the temperature detecting section 240, and causes the selected IF to communicate with the USB host. For example, when the bridge LSI 144 is being used to communicate with the USB host and the detected temperature is higher than a predetermined value, the IF control section 200 may notify the USB host that the USB2 IF 210 will be used for communication.

Figure 3:
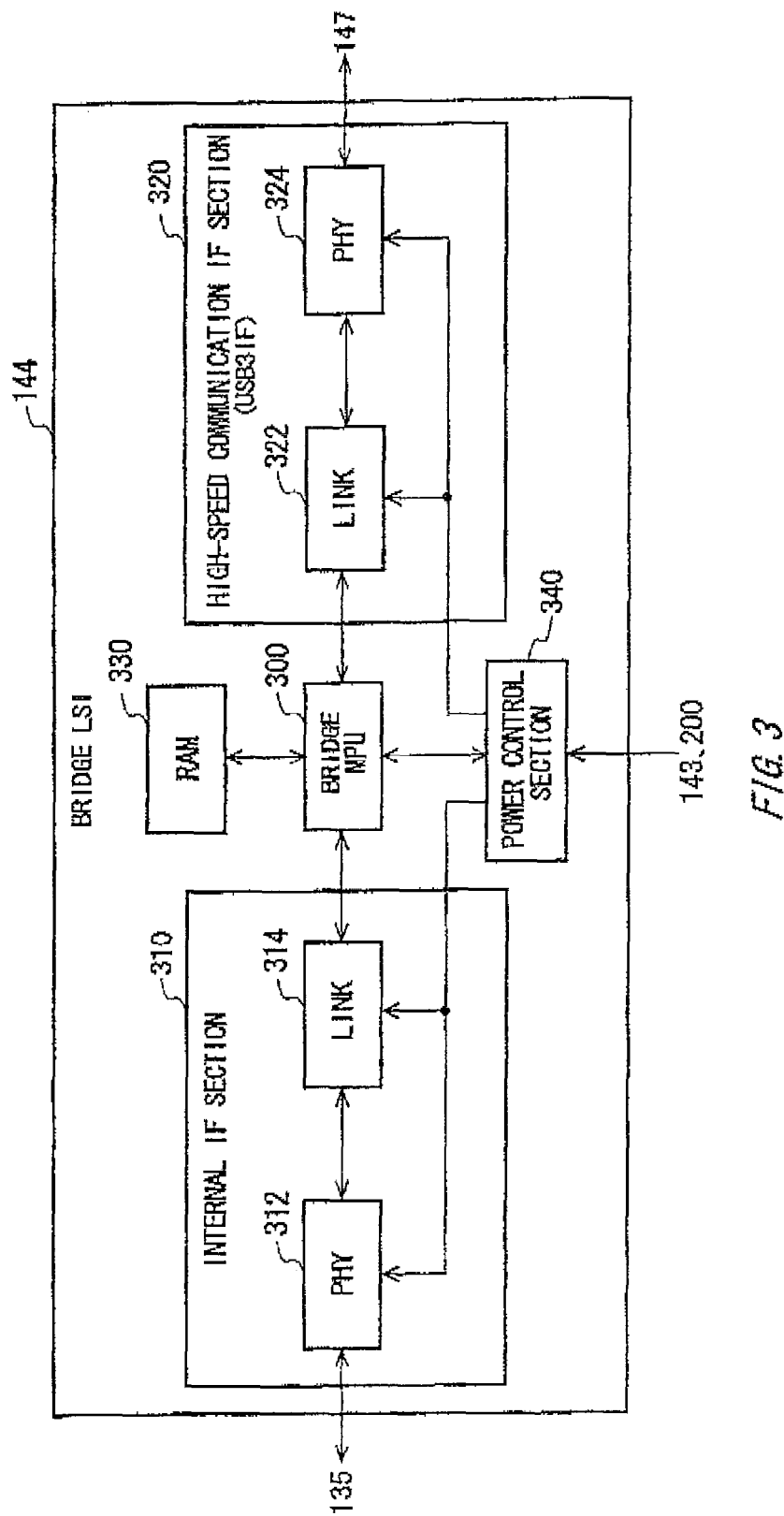
FIG. 3 shows an exemplary function block configuration of the bridge LSI 144.

FIG. 3 shows an exemplary function block configuration of the bridge LSI 144. The bridge LSI 144 includes a bridge MPU 300, an internal IF section 310, a USB3 IF 320 that is an example of a high-speed communication IF, a RAM 330 that is an example of a volatile memory, and a power control section 340.

The USB3 IF 320 is an example of an external IF circuit used for communication with the USB host. The USB3 IF 320 communicates at a speed that is higher than the first communication speed through the connecting section 145. The USB3 IF 320 includes a LINK section 322 and a PHY section 324, which are both adapted for USB 3.0 SS. The PHY section 324 is connected to the connection terminal 147, and provides the function of a physical layer of USB 3.0. The LINK section 322 is connected to the PHY section 324, and provides the function of a link layer of USB 3.0.

The internal IF section 310 is an example of an internal IF circuit used for communication with the ASIC 135. The bridge MPU 300 provides the USB3 IF 320 with data output from the internal IF section 310. The bridge MPU 300 supplies the internal IF section 310 with data output from the USB3 IF 320. The internal IF section 310 includes a PHY section 312 and a LINK section 314. The LINK section 314 provides the function of a link layer of the internal IF with the ASIC 135. The PHY section 312 provides the function of a physical layer of the internal IF.

The power control section 340 provides each component of the bridge LSI 144 with the power supplied from the power supply circuit 143. The power control section 340 limits the power supply to each component of the bridge LSI 144 under the control of the bridge MPU 300. The bridge MPU 300 limits the power supply to each component, under the control of the IF control section 200.

The RAM 330 stores firmware that is used for operation of the bridge MPU 300. The RAM 330 is an example of a memory section for loading firmware when the supply of power to the USB3 IF 320 begins. Specifically, the RAM 330 downloads and stores the firmware when the supply of power to the bridge LSI 144 begins. The firmware may be stored in the non-volatile memory of the bridge LSI 144. The firmware may be provided from the ASIC 135 or from the system memory 139. The bridge MPU 300 controls the components of the bridge LSI 144, according to the firmware stored in the RAM 330. When the bridge LSI 144 is in a power saving state, the RAM 330 can hold the firmware.

The bridge LSI 144 can set the internal IF section 310 and the USB3 IF 320 to the power saving state. For example, when USB 3.0 communication with the USB host cannot be established, the IF control section 200 transitions the internal IF section 310 and the USB3 IF 320 to the power saving state. The IF control section 200 may set the internal IF section 310 and the USB3 IF 320 to the power saving state independently. For example, when USB 3.0 communication is established, if a request for power saving is received from the USB host, the IF control section 200 may transition the USB3 IF 320, which is the USB host side IF section, to the power saving state without transitioning the internal IF section 310 to the power saving state.

In this way, when the supply of power to the bridge LSI 144 is limited, the IF control section 200 may give priority to limiting the power supply to the USB3 IF 320 over limiting the power supply to the internal IF section 310. For example, when the bridge LSI 144 is transitioned to a more strict power saving state, the IF control section 200 may limit the power supply to a plurality of circuits sequentially, beginning with the circuit portions closer to the USB host. By prioritizing power supply limitation for circuit portions closer to the USB host, the bridge LSI 144 can be transitioned quickly to a normal communication state according to the control by the IF control section 200. When limiting the power supply to the bridge LSI 144, the limiting of the power supply to each circuit may be performed with any desired order of priority. In other words, when limiting the power supply to the bridge LSI 144, the IF control section 200 may select the circuit portion for which the power supply is to be limited from among a plurality of circuit portions, and limit the power supply to the selected circuit portion.

As described above, in the image capturing apparatus 100, the ASIC 135 houses the USB2 IF 210, and the bridge LSI 144 that is independent from the ASIC 135 includes a USB3 IF 320 compliant with a newer version of USB standard. In this way, by implementing only an IP core with high reliability and operational capability in the ASIC 135, the development cost of the ASIC 135 can be decreased and reliability can be increased. Furthermore, by implementing the IF compliant with a newer version independently from the ASIC 135, the image capturing apparatus 100 having a communication function compliant with the new version can be developed quickly.

Figure 4:
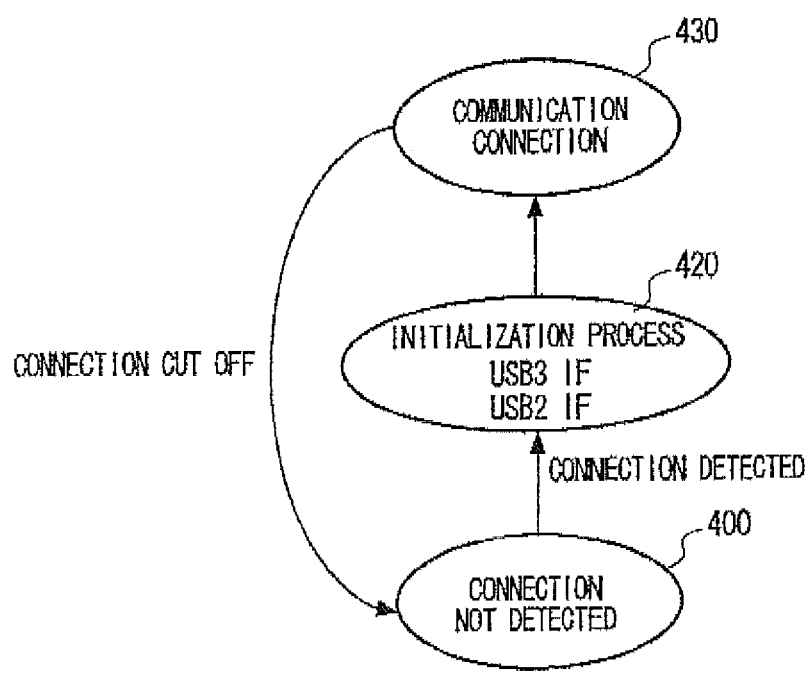
FIG. 4 shows the state transition of the image capturing apparatus 100.

FIG. 4 shows the state transition of the image capturing apparatus 100. When a connection with the USB host via a USB cable is not detected, for example, the image capturing apparatus 100 is in the disconnected state 400. In this state 400, the USB2 IF 210 operates in the power saving state, and the bridge LSI 144 is not supplied with power.

In the state 400, when the connection to the USB host is detected, the image capturing apparatus 100 transitions to the state 420. Specifically, when the addition of a voltage to the VBUS terminal greater than or equal to a predetermined value is detected, the IF control section 200 determines that a connection to the USB host has been made. In the state 420, the ASIC 135 supplies power to the bridge LSI 144 and initializes the bridge LSI 144. Furthermore, the power state of the USB2 IF 210 is transitioned from the power saving state to the normal operation power state, and the USB2 IF 210 is initialized. After initialization is completed, the image capturing apparatus 100 transitions to a state 430 in which a communication connection with the USB host is made. In this way, when a connection to the USB host via the connecting section 145 is detected, the IF control section 200 begins supplying power to the USB3 IF 320.

When it is detected that the connection to the USB host has been cut off, the image capturing apparatus 100 transitions to the state 400. In other words, when the USB host is not connected via the connecting section 145, the IF control section 200 causes the USB2 IF 210 to operate in the power saving state and cuts off the power supply to the USB3 IF 320. When the voltage of the VBUS terminal is less than a predetermined value, the IF control section 200 may determine that the connection with the USB host has been cut off. The image capturing apparatus 100 transitions to the state 400 when the USB cable is removed from the connecting section 145 or when the USB host is removed from the USB cable.

Figure 5:
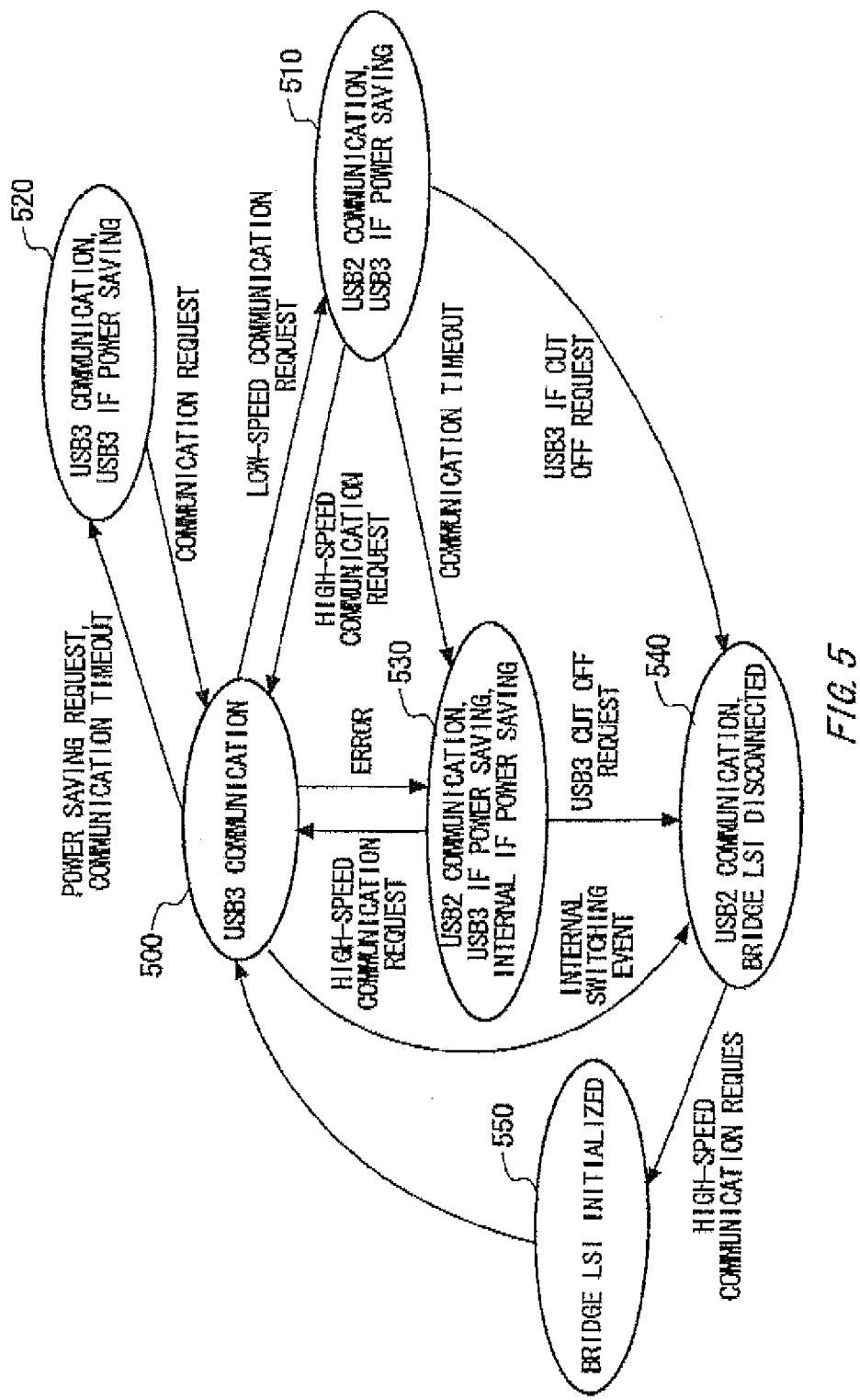
FIG. 5 shows a state transition of the state 430 occurring when the communication connection with the USB host is performed.

FIG. 5 shows a state transition occurring when the communication connection with the USB host is performed. Specifically, FIG. 5 shows the detailed state transition occurring in the state 430 of FIG. 4.

The state 500 is a state of communication with the USB host using the bridge LSI 144. In other words, the state 500 is a state of communication with the USB host via USB 3.0. In the state 500, the USB2 IF 210 is in the power saving state. In the state 500, the signal line of the USB3 IF 320 is in a connected state. Specifically, the signal line of the USB3 IF 320 is in a terminated state. In the state 500, the signal line of the USB2 IF 210 is in a disconnected state. Specifically, the signal line of the USB2 IF 210 is in a state where the pull-up is removed.

The IF control section 200 transitions to the state 520 when a communication timeout occurs in the state 500. Furthermore, the IF control section 200 transitions to the state 520 when a power saving request is received from the USB host in the state 500. In the state 520, the USB3 IF 320 is in the power saving state and the internal IF section 310 is in the normal operation state. In this way, when USB 3.0 communication is established, the USB3 IF 320 is set to the power saving state when a state of no communication persists for a prescribed time. Furthermore, in the state 520, the signal line of the USB3 IF 320 is in the connected state and the signal line of the USB2 IF 210 is in the disconnected state. In the state 520, the USB2 IF 210 is in the power saving state. In the state 520, when a communication request is received from the USB host, the IF control section 200 transitions to the state 500 through link training or the like.

When a low-speed communication request is received from the USB host in the state 500, the IF control section 200 transitions to the state 510. The low-speed transmission request can be exemplified by a request to switch to communication with USB 2.0 HS. In the state 510, the USB2 IF 210 is used for communication connection with the USB host. Specifically, in the state 510, the signal line of the USB2 IF 210 is in the connected state and the signal line of the USB3 IF 320 is in the disconnected state. Specifically, the signal line of the USB2 IF 210 is in a pull-up state, and the signal line of the USB3 IF 320 is not in a terminated state. In the state 510, the USB3 IF 320 is in the power saving state, and the internal IF section 310 is in the normal operation state. In this way, when a request to change to USB 2.0 communication is received from the USB host, the IF control section 200 begins communication with the USB2 IF 210 and transitions the bridge LSI 144 to the power saving state.

In the state 510, when a high-speed communication request is received from the USB host, the IF control section 200 transitions to the state 500 through link training, for example. The high-speed communication request can be exemplified by a request to switch to communication with USB 3.0 SS.

When a communication error is detected in the state 500, the IF control section 200 transitions to the state 530. In the state 530, the USB2 IF 210 is used for the communication connection with the USB host. Specifically, in the state 530, the signal line of the USB2 IF 210 is in the connected state and the signal line of the USB3 IF 320 is in the disconnected state. In the state 530, the USB3 IF 320 and the internal IF section 310 are both in the power saving state. In the state 530, when the high-speed communication request is received from the USB host, the IF control section 200 transitions to the state 500 through link training, for example. The high-speed communication request can be exemplified by a request to switch to communication with USB 3.0 SS. In the state 530, the internal IF section 310 and the USB3 IF 320 are in the power saving state, but the power supply thereto is not cut off. Therefore, it is possible to switch to USB 3.0 communication relatively quickly in response to a high-speed communication request.

When a USB 3.0 communication timeout occurs in the state 510, the IF control section 200 transitions to the state 530. In other words, when USB 2.0 communication is established, the IF control section 200 transitions to the state 510 and then, if a request to switch to USB 3.0 communication is not received from the USB host within a predetermined amount of time, transitions the internal IF section 330 to the power saving mode. Therefore, the internal IF section 310 is maintained in the normal operation state for a predetermined amount of time after the IF control section 200 transitions to the state 510, and therefore the USB 3.0 communication can be begun quickly under the control of the IF control section 200.

When a request to cut off the USB 3.0 communication is received from the USB host in the state 510 or the state 530, the IF control section 200 transitions to the state 540. In the state 540, the USB2 IF 210 is used for communication connection with the USB host. Specifically, in the state 540, the signal line of the USB2 IF 210 is in the connected state and the signal line of the USB3 IF 320 is in the disconnected state. In the state 540, the power supply to the USB3 IF 320 and the internal IF section 310 is cut off. For example, the entire power supply to the bridge LSI 144 may be cut off. In this way, while USB 2.0 communication is established, when a request to cut off the USB 3.0 communication IF is received from the USB host, the IF control section 200 cuts off the power supply to the bridge LSI 144. When transitioning to the state 540, the IF control section 200 may notify the USB host that it is necessary to reinitialize the bridge LSI 144 when USB 3.0 communication is resumed. Accordingly, the USB host is aware that time is needed to initialize the bridge LSI 144 when resuming the USB 3.0 communication, and can perform the process to resume the USB 3.0 communication.

In the state 540, when the request for high-speed communication is received from the USB host, the IF control section 200 transitions to the state 550. The high-speed communication request can be exemplified by a request to switch to USB 3.0 communication. In the state 550, the supply of power to the USB3 IF 320 and the internal IF section 310 is begun, and the IF control section 200 transitions to the state 500 through link training or the like. When the high-speed communication request is received from the USB host in the state 540, the IF control section 200 begins supplying power to the bridge LSI 144 and initializes the bridge LSI 144. When the initialization is completed, the IF control section 200 notifies the USB host that USB 3.0 communication can be begun.

When there is an internal switching event based on the state of the image capturing apparatus 100, e.g. the remaining capacity of the battery or the temperature in the image capturing apparatus 100, in the state 500, the IF control section 200 transitions to the state 540. At this time, the IF control section 200 notifies the USB host that communication is performed through the USB3 IF 320. The internal switching event is described further below.

As described in relation to FIG. 5, while communication with the USB host is established through one of the IF circuits, when notification is received from the USB host to select the other IF circuit as the IF circuit used for communication, the IF control section 200 begins communicating using the other IF circuit and limits the power supply to the one IF circuit. Furthermore, while communication with the USB host is established through the one IF circuit, when it is determined that communication is to be performed using the other IF circuit based on the state of the image capturing apparatus 100, the IF control section 200 notifies the USB host that the other IF circuit will be used for communication, and limits the power supply to the one IF circuit.

As described in relation to FIG. 5, the USB2 IF 210 and the bridge LSI 144 each have a function to transition to a power saving state, and the IF control section 200 switches the power saving state of each IF according to communication with the USB host. The IF control section 200 may transition each IF to the power saving state by controlling the supply of a clock to each IF. When the bridge LSI 144 is in the power saving state, the data in the RAM 330 may be held in the stored state.

The power saving state of the bridge LSI 144 includes both a state in which the power supply to the internal IF section 310 is maintained while the power supply to the USB3 IF 320 is cut off and a state in which the power supply to both the internal IF section 310 and the USB3 IF 320 is cut off. Furthermore, the power saving state of the bridge LSI 144 includes a state of maintaining the power supply to the internal IF section 310 and setting the USB3 IF 320 to a power saving state. The power saving state of the USB3 IF 320 includes a state in which the power supply to the LINK section 322 is maintained and the power supply to the PHY section 324 is cut off. In this way the power saving state of the bridge LSI 144 includes a plurality of power saving states in which different combinations of circuit portions of the bridge LSI 144 are set to a power supply state. Furthermore, each of these power saving states may further include a power saving state resulting from control of supply of a clock to the bridge LSI 144. When the bridge LSI 144 transitions to the power saving state, the IF control section 200 may cause the bridge LSI 144 to transition to a predetermined power saving state according to the operational mode of the image capturing apparatus 100 or the communication state with the USB post, from among the plurality of power saving states.

FIG. 6 shows a table format of an example for selection of the IF to be used for communication. The IF control section 200 selects one of the USB2 IF 210 and the USB3 IF 320 as the IF to be used for communication with the USB host, based on a combination of the frame rate, compression rate, and resolution of the moving image data to be transmitted to the USB host. For example, while performing image capturing, the IF control section 200 selects the IF to be used when transmitting the moving image data acquired from the image capturing to the USB host in real time. The frame rate, compression rate, and resolution of the moving image data may be designated according to user instructions. For example, combinations of the frame rate, compression rate, and resolution may be preset as operational modes for moving image processing, and the user may select one operational mode from among the preset operational modes.

Specifically, when an operational mode is selected in which the resolution of the moving image data is high and the compression rate for the moving image data in the ASIC 135 is low, the IF control section 200 selects the USB3 IF 320 regardless of the frame rate.

When an operational mode is selected in which the resolution is high, the compression rate is low, and the frame rate is high, the IF control section 200 selects the USB3 IF 320. On the other hand, when an operational mode is selected in which the resolution is high, the compression rate is high, and the frame rate is low, the IF control section 200 selects the USB2 IF 210.

When an operational mode is selected in which the resolution is low, the compression rate is low, and the frame rate is high, the IF control section 200 selects the USB3 IF 320. On the other hand, when an operational mode is selected in which the resolution is low, the compression rate is low, and the frame rate is low, the IF control section 200 selects the USB2 IF 210.

When an operational mode is selected in which the resolution is low and the compression rate is high, the IF control section 200 selects the USB2 IF 210 regardless of the frame rate. Here, high resolution refers to a resolution that is greater than or equal to a predetermined resolution, and low resolution refers to a resolution that is less than the predetermined resolution. Similarly, high compression rate refers to a compression rate that is greater than or equal to a predetermined compression rate, and low compression rate refers to a compression rate that is less than the predetermined compression rate. High frame rate refers to a frame rate that is greater than or equal to a predetermined rate, and low frame rate refers to a frame rate than is less than the predetermined rate.

When the resolution is higher, the amount of data in the moving image being transmitted is greater. When the compression rate is lower, the amount of data in the moving image being transmitted is greater. When the frame rate is higher, the amount of data in the moving image being transmitted is greater. According to the combination of resolution, compression rate, and frame rate, an estimated moving image data amount can be determined. When transmitting the moving image data captured while performing image capturing in real time, the transmission bit rate is determined by the above combination. Accordingly, the IF to be used for communication may be associated in advance according to the data amount, e.g. the bit rate, predicted form the combination of the resolution, compression rate, and frame rate. For example, an IF to be used for communication in association with a certain operational mode is set in advance, and the IF control section 200 may select the IF associated with the operational mode to be the IF used for transmission. As another example, when the operational mode is changed, the IF control section 200 may notify the USB host that the other IF circuit will be used for communication when it is determined that the other IF circuit is to be used for communication in association with the operational mode used after the change.

With the example of selecting the IF described in relation to FIG. 6, when moving image data generated by the ASIC 135 is to be transmitted to the USB host while the image capturing apparatus 100 is performing image capturing, if an operational mode is selected in which the amount of data generated per unit time is small, the USB2 IF 210 is selected and transmission can be performed. During this period, the bridge LSI 144 is set to the power saving state, and therefore the power consumption of the PHY section and LINK section is reduced, and the overall power consumption is greatly reduced. On the other band, when image capturing is performed using an operational mode in which the amount of data generated per unit time is high, the frame memory can be prevented from being filled by using the bridge LSI 144 to perform the transmission. In this way, with the image capturing apparatus 100, communication with the USB host can be performed by selecting a suitable IF according to the amount of data to be transmitted to the USB host.

In this example, the IF to be used for communication is selected according to the data amount of a moving image, but instead the IF to be used for communication can be selected according to the data amount of a still image. For example, in the case of an operational mode for acquiring still image data with a resolution that is less than a predetermined value and transmitting this still image data to the USB host, the IF control section 200 may select the USB2 IF 210. On the other hand, in the case of an operational mode for acquiring still image data with a resolution that is greater than or equal to the predetermined value and transmitting this still image data to the USB host, the IF control section 200 may select the USB3 IF 320. Compression rate may be handled in the same manner, such that the IF to be used for communication is selected according to the compression rate. For the still image data, the IF to be used for communication may be selected according to the combination of the resolution and compression rate.

The transmission time, which is the amount of time needed to transmit the data to the USB host, is determined according to the data amount and the transmission rate. The transmission time can be made shorter when using the bridge LSI 144 for communication than when using the USB2 IF 210 for communication. Therefore, when it is determined that the amount of power consumption during the transmission time in a case where the USB2 IF 210 is in the power saving state and the bridge LSI 144 is used for transmission is less than the amount of power consumption during the transmission time in a case where the bridge LSI 144 is in the power saving state and the USB2 IF 210 is used for transmission, the IF control section 200 may select the bridge LSI 144 as the IF to be used for transmission. In this way, the IF control section 200 may select the IF to communicate with the USB host based on the data amount and the transmission speed of each IF. Specifically, the IF control section 200 may select the IF to communicate with the USB hot based on the amount of power consumption per unit time in each case of an IF operating for the data amount and transmission speed determined for this IF.

For example, when repeatedly capturing images over a period time that is longer than a predetermined value and at intervals that are longer than a predetermined value, such as interval photographing or low speed photography, the transmission of the image data can be performed intermittently. In such a case, the power consumption needed to transmit all of the image data could be reduced by selecting the USB3 IF 320 for transmission only during the period when image data is transmitted. Accordingly, when an operational mode is selected for repeatedly capturing images over a time period longer than a predetermined value and at intervals longer than a predetermined value, the IF control section 200 may select the USB3 IF 320 as the IF to be used when transmitting the image data acquired from the image capturing to the USB host. In this case, the IF control section 200 transitions the bridge LSI 144 from the power saving state to the operational state when the transmission of image data to the USB host is begun, and may transition the bridge LSI 144 back to the power saving state when the transmission is finished. By repeating this operation, the power consumption required for the transmission of all the image data can be reduced. The USB3 IF 320 may be used to transmit image data to the USB host each time image capturing is performed, or to transmit a plurality of pieces of image data to the USB host at once every time a predetermined number of images are captured. Furthermore, when the data amount of image data that has yet to be transmitted exceeds a predetermined value, the USB3 IF 320 may be used to transmit the image data that has yet to be transmitted all at once to the USB host.

The moving image data is not limited to moving image data to be recorded to a non-volatile recording medium or the like. The moving image data may be moving image data for display. The moving image data for display may be image data for sequentially displaying to the user the images that are captured in series by the image capturing apparatus 100, such as image data for display of a live preview of an electronic view finder. For example, when the USB host is an external monitor that displays the image data for display transmitted through the USB, the ASIC 135 may sequentially generate image data for display and transmit the generated image data for display to the USB host through the bridge LSI 144 or the USB2 IF 210. In this case, the ASIC 135 may generate the image data with higher resolution when the resolution that can be displayed by the external monitor is higher. The ASIC 135 may generate more pieces of image data per unit time when the display rate of the external monitor is higher. The IF control section 200 may select the IF to be used for the transmission of the image data according to the resolution and display rate of the image data to be displayed in the external monitor. The transmission bit rate is determined according to the resolution and the display rate of the image data. Accordingly, the IF to be used for communication may be associated in advance according to the data amount, e.g. the bit rate, that is predicted from the combination of the resolution of the display rate. For example, an IF to be used for the image data transmission can be associated with each combination of a resolution and display rate of image data, and the IF associated with the combination of the resolution and display rate of the image data to be displayed in the external monitor may be selected by the IF control section 200 as the IF to perform the transmission.

With the control described above, the IF to be used for the transmission can be changed according to the display capabilities of the external monitor. Accordingly, when connected to a large external monitor having a high display rate, for example, the image capturing apparatus 100 can display the images captured thereby with high resolution and in real time by using the bridge LSI 144 to perform transmission. On the other hand, when connected to a small external TV with a low display rate, for example, the power consumption of the image capturing apparatus 100 can be decreased by using the USB2 IF 210 to perform transmission. The external monitor may be connected to a personal computer that functions as the USB host.

FIG. 7 shows another example of selection of the IF to be used for communication, in a table format. When the power supply 170 is a battery such as a two-dimensional battery, the IF control section 200 selects one of the USB2 IF 210 and the USB3 IF 320 as the IF to be used for communication with the USB host, based on the remaining capacity of the battery.

Specifically, when the remaining capacity is greater than a predetermined value, the IF control section 200 selects the USB3 IF 320. On the other band, when the remaining capacity is less than the predetermined value, the IF control section 200 selects the USB2 IF 210. Therefore, while performing communication using the USB3 IF 320, when the remaining capacity becomes less than the predetermined value, the IF control section 200 can switch to the USB2 IF 210 to perform communication. In this case, the IF control section 200 may cut off the power supply to the bridge LSI 144. With the control described above, the battery can be prevented from dying quickly.

FIG. 8 shows yet another example of selection of the IF to be used for communication, in a table format. The IF control section 200 selects one of the USB2 IF 210 and the USB3 IF 320 as the IF to be used for communication with the USB host, based on the temperature detected by the temperature sensor 148 and the temperature detecting section 240.

Specifically, when the temperature is less than a predetermined value, the IF control section 200 selects the USB3 IF 320. On the other hand, when the temperature is higher than a predetermined value, the IF control section 200 selects the USB2 IF 210. Therefore, while using the USB3 IF 320 for communication, when the temperature becomes greater than or equal to the predetermined value, the IF control section 200 can switch to the USB2 IF 210 to perform communication. In this case, the IF control section 200 may cut off the power supply to the bridge LSI 144. With this control, extremely high temperatures within the image capturing apparatus 100 can be avoided. As a result, the image capturing apparatus 100 can decrease the chances of incorrect operation.

As described in relation to FIGS. 6 to 8, the IF control section 200 selects the IF for communicating with the USB host according to causes on the image capturing apparatus 100 side, such as the operational mode of the image capturing apparatus 100, the power supply state including the capacity and remaining capacity, and the temperature, for example. Specifically, an IF to be used for communication is set in advance in association with each cause, and the IF control section 200 selects the IF that is associated with a current cause in the image capturing apparatus 100 to be the IF for communication. When the USB2 IF 210 is associated with at least one of a plurality of current causes in the image capturing apparatus 100, the IF control section 200 may select the USB2 IF 210 as the IF to be used for communication. If an IF to be used for communication is associated in advance with a combination of a plurality of causes, the IF control section 200 may select the IF associated with the combination of current causes in the image capturing apparatus 100 as the IF to be used for communication.

In relation to FIG. 5, when the image capturing apparatus 100 is in the state 500, the image capturing apparatus 100 transitions to the state 540 in response to an internal switching event. The internal switching event may be an event of switching to the USB2 IF 210 based on a cause on the image capturing apparatus 100 side. The basis for selecting the if is not limited to the operational mode, power supply state, or temperature, and the IF to be used may be designated directly by the user. For example, the user may designate which version of USB 2.0 or USB 3.0 is to be used for communication. For example, while in the state 500, when the user designates communication using USB 2.0, the IF control section 200 may transition to the state 540. In this way, while in the state 500, the IF control section 200 may transition to the state 540 when it is determined that the IF to be used for communication is selected to be the USB2 IF 210 in response to a cause on the image capturing apparatus 100 side.

When the USB2 IF 210 is selected as the IF to be used for communication with the USB host, the operation setting section 220 may limit the operation modes of the image capturing apparatus 100 that can be selected by the user. For example, as shown by the example of the operational mode for high resolution, low compression rate, and high frame rate shown in FIG. 6, the image capturing apparatus 100 may prevent the user from selecting the operational mode using the USB3 IF 320. For example, when the user uses the menu format to select the operational mode of the image capturing apparatus 100 through the display apparatus of the USB host or the display section 138, the menu items relating to operational modes using the USB3 IF 320 may be grayed out.

When switching to the USB2 IF 210 in response to a cause on the image capturing apparatus 100 side, the IF control section 200 may cut off the power supply to the bridge LSI 144. When cutting of the power supply to the bridge LSI 144, if the USB3 IF 320 is in a selectable state based on the power supply state and temperature, for example, the IF control section 200 may notify the USB host that USB 3.0 can be used. Furthermore, when the USB3 IF 320 is switched to in response to a cause on the image capturing apparatus 100 side, the IF control section 200 may transition the USB2 IF 210 to the power saving state.

Figure 9:
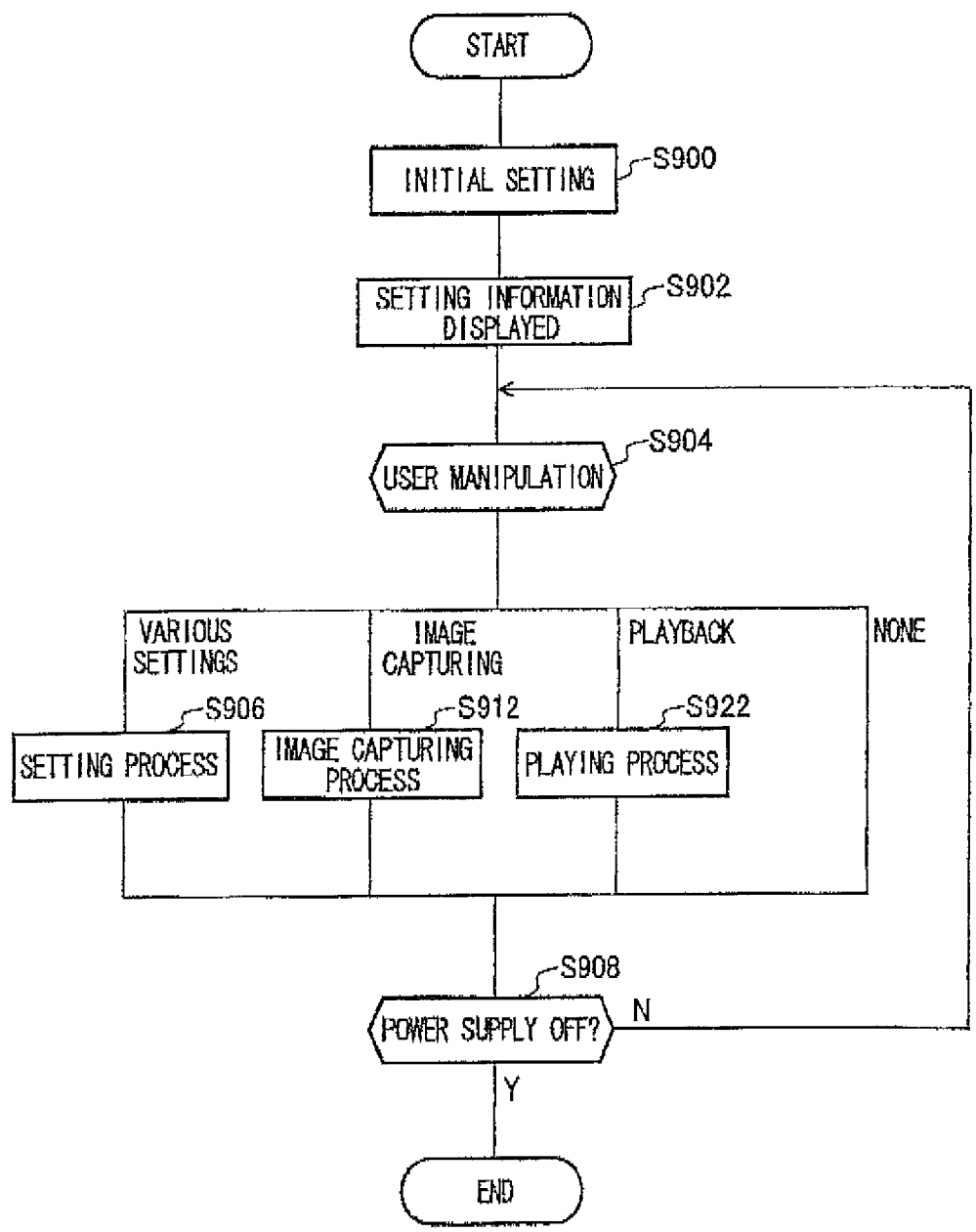
FIG. 9 shows a process flow up to the point at which startup of the image capturing apparatus 100 ends.

FIG. 9 shows a process flow up to the point at which startup of the image capturing apparatus 100 ends. This process flow is started when the power supply switch, which is a portion of the manipulation input section 141, is switched to the ON position, for example. This process flow is performed by the camera MPU 133 and the ASIC 135 controlling each component of the image capturing apparatus 100.

At step S900, the image capturing apparatus 100 begins the initialization setting. For example, various parameters for controlling the image capturing apparatus 100 are expanded by the SDRAM 136 from the system memory 139. Furthermore, the ASIC 135 sets the operational mode of the image capturing apparatus 100 based on the various expanded parameters. For example, the ASIC 135 sets the resolution compression rate, frame rate, and various settings of the image capturing element 132 such as the shutter speed and the image capturing sensitivity, for example. Furthermore, initialization of the USB2 IF 210 and the like is performed as a portion of this initialization. The initialization of the USB2 IF 210 and the like is described in relation to FIG. 10.

Next, at step S902, the ASIC 135 displays in the display section 138 the content set according to the initial setting. For example, the ASIC 135 displays information such as the shutter speed, image capturing sensitivity, resolution, compression rate, and frame rate in the display section 138, using a variety of formats such as icon displays.

Next, at step S904, the ASIC 135 identifies user instructions input to the manipulation input section 141. If the user instructions indicate the "various settings," the setting process indicated by the instructions is performed by the ASIC 135 (S906). These instructions can be instructions designating one of the operational modes described above, instructions designating communication using one of USB 2.0 and USB 3.0, or the like, for example.

At step S904, if it is determined that the user instructions are to perform a process that includes an image capturing operation, the process indicated by the instructions is performed (step S912). These instructions can be exemplified by manipulation of the release button, live preview switch, or moving image button. As a portion of the process performed at step S912, a process of transmitting the image data acquired from the image capturing to the USB host can be included.

At step S904, if it is determined that the user instructions relate to playback, the playback process is performed (step S922). The playback process can be exemplified by a process of displaying a thumbnail of image data, e.g. still image data or moving image data, recorded in the external memory 160, or a process of displaying an image using image data designated by the user. Furthermore, as a portion of the playback process, a process of transmitting image data to the USB host in response to the user instructions can be included.

If it is determined at step S904 that there are no user instructions, the process moves to step S908. Furthermore, when step S906, step S912, or step S922 is completed, the process moves to step S908. At step S908, it is determined whether the power supply is OFF. For example, the power supply is determined to be OFF if the power supply switch is in the OFF position or if user instructions are not input for a predetermined time period from when the image capturing apparatus 100 begins operating, for example. If the power supply is determined to be OFF, this process flow ends, and if it is determined that the power supply is not OFF, the process moves to step S904.

Figure 10:
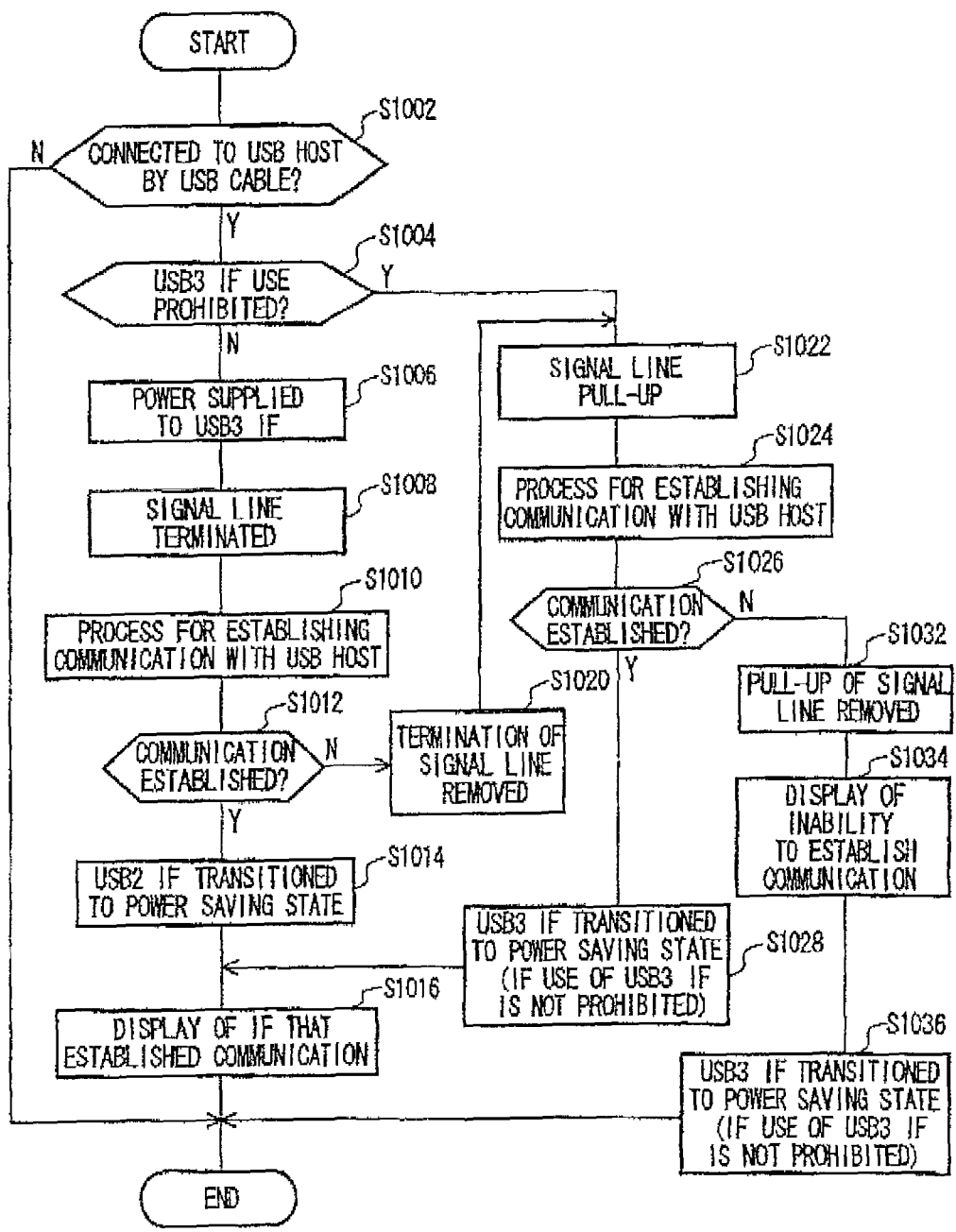
FIG. 10 shows a process flow for the initial setting relating to USB communication.

FIG. 10 shows a process flow for the initial setting relating to USB communication. This process flow is a portion of the process of step S900 shown in FIG. 9, and is performed by the IF control section 200. This process flow begins after the USB2 IF 210 is initialized, for example.

At step S1002, the IF control section 200 determines whether the USB host is connected thereto via the connecting section 145. Specifically, the IF control section 200 determines that the USB host is connected thereto via the connecting section 145 if the addition of a predetermined voltage to the VBUS terminal is detected. If it is determined that the USB host is not connected, this process flow ends.

If it is determined at step S1002 that the USB host is connected, it is determined whether use of the USB3 IF 320 as the IF for communication is prohibited (S1004). For example, when it is determined that the USB2 IF 210 is to be selected as the IF to be used for communication, based on a cause on the image capturing apparatus 100 such as described in relation to FIGS. 6 to 8, it is determined that use of the USB3 IF 320 is prohibited. For example, it is determined that use of the USB3 IF 320 is prohibited if the capacity of the battery is less than a predetermined value. As another example, it is determined that use of the USB3 IF 320 is prohibited if the remaining capacity of the battery is less than a predetermined value.

If it is determined at step S1004 that the USB2 IF 210 is not to be selected as the IF for communication, the power supply to the bridge LSI 144 is begun (step S1006). Next, the signal line of the USB3 IF 320 is terminated, such that the USB host can detect the image capturing apparatus 100 (step S1008). Next, the process for establishing the communication connection with the USB host via the USB3 IF 320 is performed (S1010). This process includes link training.

Next, at step S1012, it is determined whether the communication connection has been established with the USB3 IF 320. If the communication connection has been established via the USB3 IF 320, the USB2 IF 210 is transitioned to the power saving state (step S1014). The information identifying the IF that has established the communication connection is then displayed in the display section 138 (step S1016), and the process ends.

If it is determined at step S1012 that the communication connection cannot be established via the USB3 IF 320, the termination of the signal line is removed at step S1020, and the process then moves to step S1022. If it is determined at step S1004 that the USB2 IF 210 is to be selected as the IF for communication, the process moves to step S1022.

At step S1022, the signal line of the USB2 IF 210 is pulled-up, such that the USB host can detect the image capturing apparatus 100. Next, the process for establishing the communication connection with the USB host via the USB2 IF 210 is performed (step S1024). Next, it is determined whether the communication connection via the USB2 IF 210 was able to be established (step S1026). If the communication connection was established, the USB3 IF 320 is transitioned to the power saving state if use of the USB3 IF 320 is not prohibited (step S1028), and the process moves to step S1016. If the communication connection could not be established, the pull-up of the signal line is removed (step S1032), and an indication that the communication connection could not be established is displayed in the display section 138 (step S1034). If use of the USB3 IF 320 is not prohibited, the USB3 IF 320 is transitioned to the power saving state (step S1036), and the process ends.

In this way, when the USB host is connected via the connecting section 145, the IF control section 200 transitions to a state in which the USB3 IF 320 handles communication with the USB host, and the process for beginning the communication connection, e.g. link training, can be started. When communication with the USB host via the USB3 IF 320 is established, the IF control section 200 transitions the USB2 IF 210 to the power saving state. If communication with the USB host via the USB3 IF 320 cannot be established, the IF control section 200 uses the USB2 IF 210 to handle communication with the USB host, and transitions the bridge LSI 144 to the power saving state.

Figure 11:
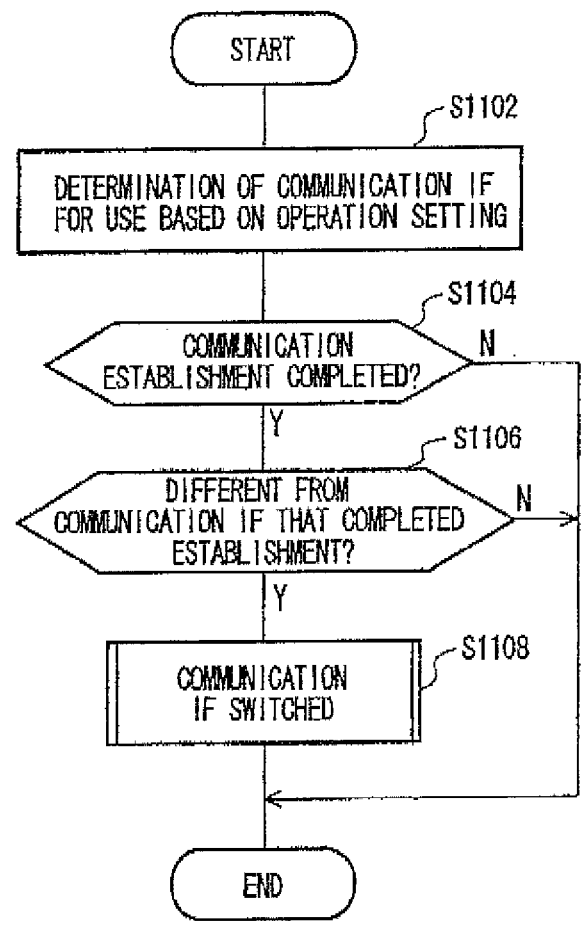
FIG. 11 is an exemplary process flow for switching the IF used for communication based on an operation setting.

FIG. 11 is an exemplary process flow for switching the IF used for communication based on an operation setting. This process flow is a portion of the process performed at step S906 in FIG. 9, and is performed by the IF control section 200. For example, this process flow is performed when the operation mode is changed by the user.

When this process flow begins, at step S1102, the IF to be used for communication is determined based on the operation setting. Specifically, the IF to be used for communication is determined based on the combination of resolution, compression rate, and frame rate described in relation to FIG. 6.

Next, it is determined whether the communication connection is established. If the communication connection is established, at step S1106, it is determined whether the IF determined at step S1102 is different from the IF that has established the communication connection. If the IF determined at step S1102 is different from the IF that has established the communication connection, the IF used for communication is switched (step S1108), and the process ends. This switching process is described in relation to FIG. 13.

If it is determined at step S1106 that the IF determined at step S1102 is the same as the IF that has established the communication connection, the process flow ends without switching the IF used for communication. If it is determined at step S1104 that the communication connection is not established, this process flow ends.

Figure 12:
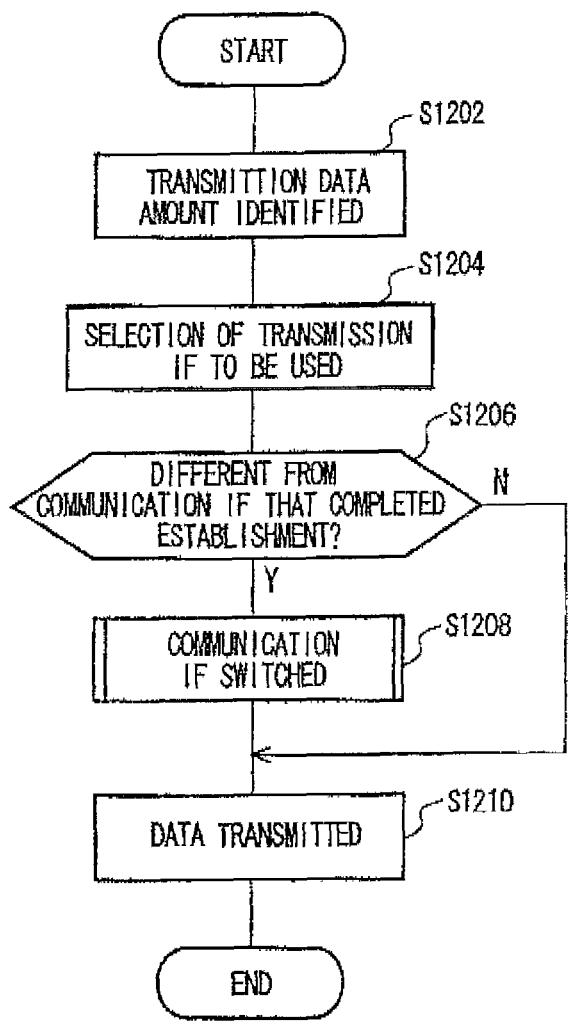
FIG. 12 is a process flow for transmitting image data.

FIG. 12 is a process flow for transmitting image data. This process flow is a portion of the process performed at step S922 in FIG. 9, and is performed by the IF control section 200. For example, this process flow is started upon receiving instructions to transmit to the USB host the image data selected by the user.

At step S1202, the amount of data to be transmitted to the USB host is identified. For example, the total data amount of the image data selected by the user is identified.

The IF control section 200 selects the IF to be used for communication based on the amount of data to be transmitted. For example, if the amount of data to be transmitted is greater than or equal to a predetermined data amount, the IF control section 200 selects the USB3 IF 320. On the other hand, if the amount or data to be transmitted is less than the predetermined data amount, the IF control section 200 selects the USB2 IF 210.

Next, at step S1206, it is determined if the IF selected at step S1204 is different from the IF that has established communication. If the IF selected at step S1204 is different from the IF that has established communication, the IF used for communication is switched (step S1208), the data transmission is begun (step S1210), and this process flow ends. If the IF selected at step S1204 is the same as the IF that has established communication, the process moves to step S1210 without switching the IF used for communication, and the data transmission is begun.

Figure 13:
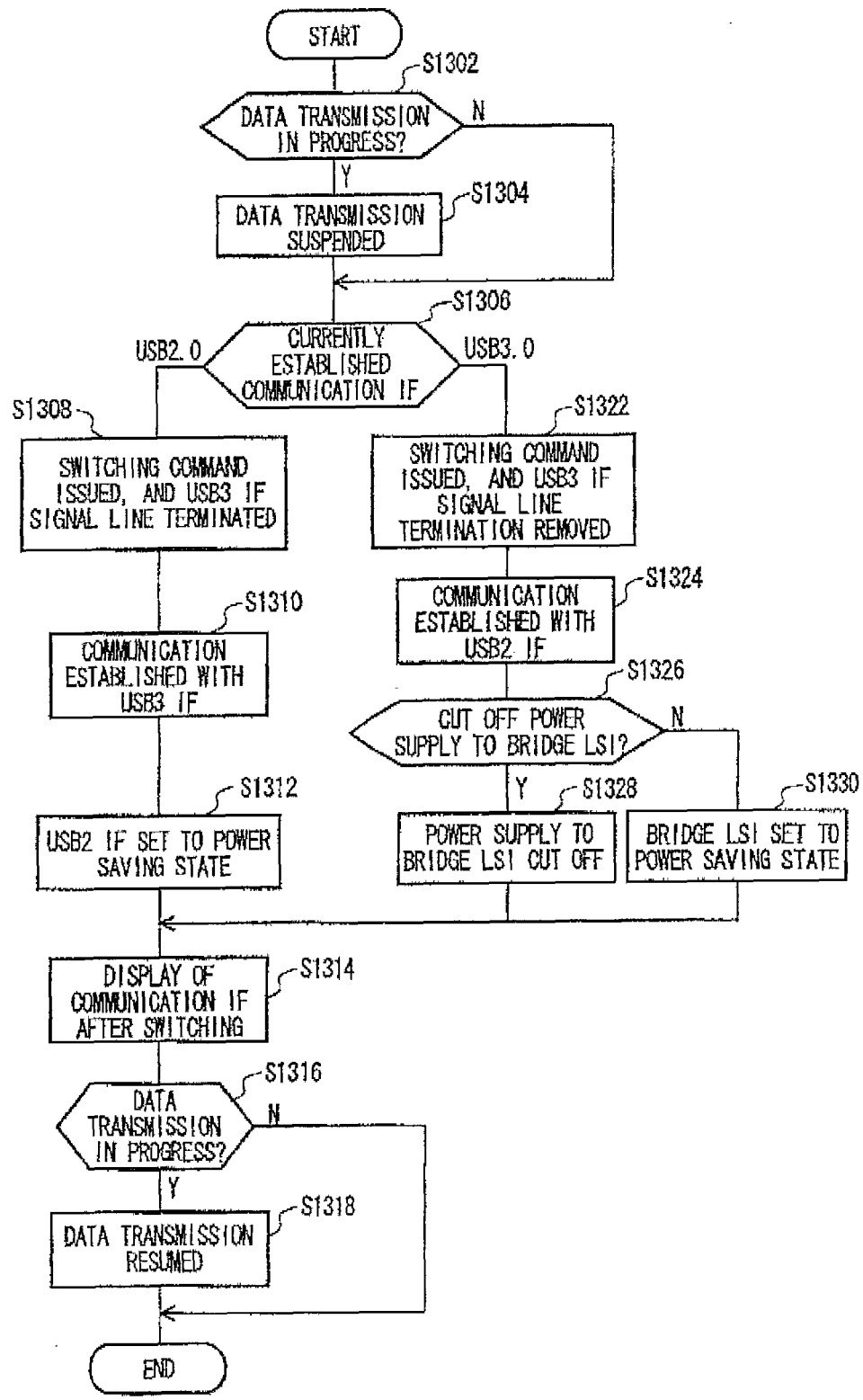
FIG. 13 is a process flow for switching the IF to be used for communication.

FIG. 13 is a process flow for switching the IF to be used for communication. This process flow can be used as a detailed process of step S1108 in FIG. 11 and step S1208 in FIG. 12. This process flow is performed by the IF control section 200.

When this process flow begins, at step S1302, it is determined whether the transmission of data to the USB host is in progress. If data transmission is in progress, the transmission is suspended at step S1304, and the process moves to step S1306. If data transmission is not in progress, the process moves to step S1306.

At step S1306, it is determined whether there is currently an IF establishing a communication connection. If there is currently an IF establishing a communication connection the USB2 IF 210, a switching command is issued and the signal line of the USB3 IF 320 is terminated. The switching command is a request made to the USB host for a switching process, by using the Set Port Feature to switch to a higher level port.

Next, the communication connection is established via the USB3 IF 320 (step S1310), the USB2 IF 210 is transitioned to the power saving state (S1312), and the information indicating the IF resulting from the switch is displayed in the display section 138 (S1314). Next, at step S1316, it is determined whether data transmission was in progress. If it is determined that data transmission was in progress, the transmission is resumed (step S1318) and this process flow ends. If data transmission was not in progress, this process flow ends. In this way, the IF control section 200 can dynamically switch the IF used for transmission of continuous data.

If it is determined at step S1306 that the communication connection is currently established by the USB3 IF 320, the switching command is issued and the termination of the signal line of the USB3 IF 320 is removed. The switching command is a request made to the USB host for a switching process, by using the Set Port Feature to switch to a higher level port.

Next, the communication connection is established through the USB2 IF 210 (S1324). Specifically, the USB2 IF 210 is initialized, the signal line of the USB2 IF 210 is pulled-up, and the host is notified that the communication connection is established via the USB2 IF 210.

When the communication connection via the USB2 IF 210 is completed, it is determined whether the power supply to the bridge LSI 144 is to be cut off (step S1326). For example, when switching the IF according to an internal switching event such as described in relation to FIG. 5, it is determined that the power supply to the bridge LSI 144 is to be cut off. If the power supply to the bridge LSI 144 is to be cut off, the power supply to the bridge LSI 144 is cut off (step S1328) and the process moves to step S1314. If the power supply to the bridge LSI 144 is not to be cut off, the bridge LSI 144 is set to the power saving state (step S1330), and the process proceeds to step S1314.

In this way, the image capturing apparatus 100 can switch the IF being used and transmit the data, without changing the PTP protocol shared by USB 2.0 and USB 3.0. When switching to one of the IFs, the power supply to the other IF is limited. For example, by setting the other IF to a power saving state, the power consumed by the other IF can be reduced. Therefore, the overall power consumption is reduced, and increase in overhead needed for the switching can be prevented.

In the above explanation, the USB2 IF 210 has a power saving state and the USB3 IF 320 has a plurality of power saving states and a state in which power is cut off. However, the USB2 IF 210 may include a state in which the power supply is cut off, in addition to the power saving state. Furthermore, the bridge LSI 144 may have a plurality of power saving states based on combinations of power supply states for each of a plurality of circuit portions of the bridge LSI 144. Not only the bridge LSI 144, but also that USB2 IF 210 may have a plurality of power saving states based on combinations of power supply states for each of a plurality of circuit portions thereof.

In the above description, the connecting section 145 is one USB receptacle. A USB receptacle is an example of a receptacle that receives a plug including an element for communication with an external device. The plug may be provided on one end of a flexible communication cable, or may be provided integrally with the external device. The connecting section 145 is not limited to a receptacle. For example, the connecting section 145 may be a jack. As another example, the connecting section 145 may be a plug that is received by a receptacle. In other words, the connecting section 145 may be a single connector, such as a receptacle, jack, or plug, for example.

In the above description, the image capturing apparatus 100 functions as the USB device. However, the image capturing apparatus 100 may instead function as the USB host. In the image capturing apparatus 100, the ASIC 135 houses the USB2 IF 210, and the USB3 IF 320 compliant with the newer version of a USB standard is included in the bridge LSI 144, which is independent from the ASIC 115. However, the ASIC 135 may house both the USB2 IF 210 and the USB3 IF 320. In the above description, the image capturing apparatus 100 includes the camera MPU 133 and the ASIC 135, but the ASIC 135 may have the function of the camera MPU 133 described above.

The functions and operations of the image capturing apparatus 100 were described using USB standards as the communication standards. USB 2.0 and USB 3.0 were used as the versions in the above example, to describe the functions and operations of the image capturing apparatus 100. However, the present invention can be applied to other versions of the USB standard. In other words, the image capturing apparatus 100 may include an IF circuit compliant with a first version of the USB standard and an IF circuit compliant with a second version of the USB standard, which sets a communication speed that is higher than the maximum communication speed set by the first version of the USB standard. In addition to the USB standard, the communication standards that can be applied to the image capturing apparatus 100 include PCI-Express, IEEE1394, and Thunderbolt. Furthermore, the data included in the data transmission is not limited to image data, and various types of digital data such as audio data can be used in the data transmission.

In the above description, the process described as the operation of the camera MPU 133 is realized by the camera MPU 133 controlling the hardware of the image capturing apparatus 100 according to a program. Furthermore, the process realized by the ASIC 135 in the above description can be realized by a processor. Furthermore, the process described as the operation of the ASIC 135 is realized by a processor controlling the hardware of the image capturing apparatus 100 according to a program. In other words, the processes described in relation to the image capturing apparatus 100 of the present embodiment can be realized by a processor operating according to a program to control hardware, thereby having the program and the hardware, including the processor, memory, and the like, work together. In other words, this process can be realized by a computer apparatus. A computer apparatus may load a program for controlling the execution of the above process, operate according to this program, and perform the above process. The computer apparatus can load this program from a computer readable recording medium on which the program is stored.

The present embodiment describes the functions and operations of the image capturing apparatus 100 as a single lens reflex camera. Instead of a single lens reflex camera, the image capturing apparatus can be any of a variety of devices having an image capturing function, including a compact digital camera, which is an example of a non-interchangeable lens camera, a mirrorless single lens camera, a video camera, an image capturing device for broadcasting, a mobile phone with an image capturing function, a portable information terminal with an image capturing function, and an entertainment apparatus such as a game device with an image capturing function. Furthermore, the present invention is not limited to a image capturing apparatus, and can also be applied to a computer such as a personal computer, a television, an image recording apparatus such as a video apparatus, a digital photo frame, a projector apparatus, a hard disk apparatus, a printer, a memory card, or an electronic device such as an audio recorder.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An electronic device comprising:
   an imaging element that images an object and outputs image data;
   a connecting section;
   a first interface circuit that communicates through the connecting section with an external device connected via the connecting section, at a first communication speed;
   a second interface circuit that communicates through the connecting section with the external device, at a communication speed that is higher than the first communication speed; and
   a control section that, when one of the first interface circuit and the second interface circuit is selected as an interface circuit to be used for communication, limits a power supply to the other interface circuit, wherein
   the control section causes the second interface circuit to communicate with the external device when imaging is repeatedly performed by the imaging element for a period of time longer than a specified period of time.

2. The electronic device according to claim 1, wherein when the external device is connected via the connecting section, the control section transitions the second interface circuit to a state in which the second interface circuit handles the communication with the external device.

3. The electronic device according to claim 2, wherein when communication with the external device cannot be established through the second interface circuit, the control section causes the first interface circuit to handle communication with the external device.

4. The electronic device according to claim 2, wherein when communication with the external device has been established through the second interface circuit, the control section transitions the first interface circuit to a power saving state.

5. The electronic device according to claim 1, wherein the connecting section is one receptacle that receives a plug including a terminal for the communication via the connecting section.

6. The electronic device according to claim 1, wherein the first interface circuit is included in a first circuit portion, and
the second interface circuit is included in a second circuit portion that is independent from the first circuit portion.

7. The electronic device according to claim 6, wherein the first circuit portion is an ASIC, and
the second circuit portion is a bridge LSI connected to the first circuit portion.

8. The electronic device according to claim 6, wherein the connecting section includes a first detection terminal for detecting that the electronic device is electrically connected to the external device via the connecting section, and
the first circuit portion detects that the external device is connected via the connecting section, using the first detection terminal.

9. The electronic device according to claim 6, wherein the second interface circuit includes a plurality of circuit portions, and
when limiting the power supply to the second interface circuit, the control section selects a circuit portion for which the power supply is to be restricted from among the plurality of circuit portions, and limits the power supply to the selected circuit portion.

10. The electronic device according to claim 9, wherein the second interface circuit includes:
   an external interface circuit that handles communication with the external device; and
   an internal interface circuit that handles communication with the first circuit portion, and
when limiting the power supply to the second interface circuit, the control section prioritizes limiting the power supply to the external interface circuit over limiting the power supply to the internal interface circuit.

11. The electronic device according to claim 1, wherein the connecting section is compliant with a USB standard,
the first interface circuit is compliant with a first version of the USB standard,
the second interface circuit is compliant with a second version of the USB standard, which sets a communication speed that is higher than a maximum communication speed set by the first version of the USB standard.

12. The electronic device according to claim 1, wherein when the external device is not connected via the connecting section, the control section causes the first interface circuit to operate in a power saving state and cuts off the power supply to the second interface circuit.

13. The electronic device according to claim 12, wherein when it is detected that the external device is connected via the connecting section, the control section begins the power supply to the second interface circuit.

14. The electronic device according to claim 1, wherein the second interface circuit includes a memory section that loads firmware when the power supply to the second interface circuit is begun, when the first interface circuit is selected as the interface circuit to be used for communication, the control section transitions the second interface circuit to the power saving state, and the memory section holds the firmware that is loaded when in the power saving state.

15. The electronic device according to claim 1, wherein while communication with the external device is established through one of the interface circuits, when notification is received from the external device that the other interface circuit is selected as the interface circuit to be used for communication, the control section begins communication using the other interface circuit and limits the power supply to the one interface circuit.

16. The electronic device according to claim 1, wherein while communication with the external device is established through one of the interface circuits, when it is determined based on a state of the electronic device that the other interface circuit is to be used for communication, the control section notifies the external device that the other interface circuit will be used for communication and limits the power supply to the one interface circuit.

17. The electronic device according to claim 16, wherein when changing an operational mode of the electronic device, when it is designated that the other interface circuit associated with the operational mode after the change is to be used for communication, the control section notifies the external device that the other interface circuit will be used for communication.

18. The electronic device according to claim 16, further comprising a remaining capacity detecting section that detects a remaining capacity of a battery providing operating power to the electronic device, wherein when the second interface circuit is being used to communicate with the external device and the detected remaining capacity is less than a predetermined value, the control section notifies the external device that the first interface circuit will be used for communication.

19. The electronic device according to claim 16, further comprising a temperature detecting section that detects temperature within the electronic device, wherein when the second interface circuit is being used to communicate with the external device and the detected temperature is greater than a predetermined value, the control section notifies the external device that the first interface circuit will be used for communication.

20. The electronic device according to claim 1, wherein when a capacity of a battery supplying operating power to the electronic device is less than a predetermined value, the control section selects the first interface circuit as the interface circuit to be used for the communication.

21. The electronic device according to claim 1, further comprising a display control section that displays, in a display section, information indicating the interface circuit selected as the interface circuit to be used for communication with the external device.

22. The electronic device according to claim 1, wherein the first interface circuit and the second interface circuit transmit, to the external device, the image data output by the imaging element.

23. A non-transitory computer readable storage medium storing thereon a program that causes a computer, which includes (i) a first interface circuit that communicates through a connecting section with an external device connected via the connecting section at a first communication speed and (ii) a second interface circuit that communicates through the connecting section with the external device at a communication speed that is higher than the first communication speed, to:

when one of the first interface circuit and the second interface circuit is selected as an interface circuit to be used for communication, limit a power supply to the other interface circuit; and cause the second interface circuit to communicate with the external device when imaging is repeatedly performed by an imaging element for a period of time longer than a specified period of time.

* * * * *